(12) United States Patent
Kopiychenko et al.

(10) Patent No.: US 11,212,198 B2
(45) Date of Patent: Dec. 28, 2021

(54) MANAGING INTERACTION LIMITS BETWEEN USER DEVICES IN A MESSAGING SYSTEM

(71) Applicant: Thumbtack, Inc., San Francisco, CA (US)

(72) Inventors: Denys Kopiychenko, Pleasanton, CA (US); Muxing Chen, San Francisco, CA (US); Scott Zuccarino, San Francisco, CA (US); Jeffrey Lock, Menlo Park, CA (US); Zhenyu Liu, San Jose, CA (US); Tracy Livengood, San Francisco, CA (US); Samuel Joseph Finegold, San Francisco, CA (US); Jason Kim, Berkeley, CA (US); Allan Yu, Oakland, CA (US)

(73) Assignee: THUMBTACK, INC., San Francisco, CA (US)

(*) Notice: Subject to any disclaimer, the term of this patent is extended or adjusted under 35 U.S.C. 154(b) by 0 days.

(21) Appl. No.: 16/789,340

(22) Filed: Feb. 12, 2020

(65) Prior Publication Data
US 2020/0259721 A1 Aug. 13, 2020

Related U.S. Application Data

(60) Provisional application No. 62/805,236, filed on Feb. 13, 2019.

(51) Int. Cl.
*H04L 12/24* (2006.01)
*G06Q 30/02* (2012.01)
*H04L 12/58* (2006.01)

(52) U.S. Cl.
CPC ...... *H04L 41/5051* (2013.01); *H04L 41/5093* (2013.01); *G06Q 30/02* (2013.01); *H04L 51/04* (2013.01)

(58) Field of Classification Search
CPC . H04L 41/5051; H04L 41/5093; H04L 51/04; G06Q 30/02
See application file for complete search history.

(56) References Cited

U.S. PATENT DOCUMENTS

| 7,603,294 B2 * | 10/2009 | Singh | G06Q 10/087 |
| | | | 705/14.71 |
| 9,736,268 B1 * | 8/2017 | Tsay | H04L 67/327 |

(Continued)

*Primary Examiner* — John M Macilwinen
(74) *Attorney, Agent, or Firm* — Nicholson De Vos Webster & Elliott LLP (57) ABSTRACT

A server computer receives configuration data from a first user of a first user device and establishes an interaction limit for the first user based on the configuration data. The server computer subsequently receives a request message from a second user device of a second user that includes parameters, including a request for services. The server computer selects the first user from a plurality of users based on the parameters and the configuration data from the first user. The server computer transmits a quote message to the second user device indicating the selection of the first user and including a quote. When the server computer receives an indication of a response message from the second user device, the server computer processes the response message and determines if the response message is indicative of an interaction type that requires modifying a first user account associated with the first user.

21 Claims, 6 Drawing Sheets

(56) References Cited

U.S. PATENT DOCUMENTS

| | | | | |
|---|---|---|---|---|
| 10,380,631 B2* | 8/2019 | Altberg | | G06Q 30/0251 |
| 2006/0224496 A1* | 10/2006 | Sandholm | | G06Q 40/04 |
| | | | | 705/37 |
| 2009/0049127 A1* | 2/2009 | Juan | | G06Q 10/10 |
| | | | | 709/204 |
| 2011/0288935 A1* | 11/2011 | Elvekrog | | G06Q 30/0241 |
| | | | | 705/14.53 |
| 2014/0330642 A1* | 11/2014 | Hu | | G06Q 30/0253 |
| | | | | 705/14.51 |
| 2015/0046935 A1* | 2/2015 | Wei | | G06Q 30/0251 |
| | | | | 725/14 |
| 2016/0065519 A1* | 3/2016 | Waltermann | | H04L 67/10 |
| | | | | 709/206 |
| 2016/0198509 A1* | 7/2016 | Hayes, Jr. | | H04W 4/14 |
| | | | | 370/329 |
| 2018/0375947 A1* | 12/2018 | Hodges | | H04L 67/10 |
| 2019/0122277 A1* | 4/2019 | Shirk | | G06Q 30/0613 |

* cited by examiner

MANAGING INTERACTION LIMITS BETWEEN USER DEVICES IN A MESSAGING SYSTEM

CROSS-REFERENCE TO RELATED APPLICATIONS

This application claims the benefit of U.S. Provisional Application No. 62/805,236, filed Feb. 13, 2019, which is hereby incorporated by reference.

TECHNICAL FIELD

Embodiments of the invention relate to the field of network communications, and more specifically, to managing interaction limits between user devices in a messaging system.

BACKGROUND

Messaging systems can use communications networks (e.g., the internet) to transmit messages between user devices. The ability to use communications networks, including the Internet, to transmit messages between user devices, also provides a drawback: users receiving excessive communications. In situations where messages are being received by a service provider, excessive communications can result in a negative impact to the service provider, including a negative user experience. In addition, blocking or preventing communications can also result in a negative impact to service providers, as well as to service requester whose requests may not be efficiently distributed.

BRIEF DESCRIPTION OF THE DRAWINGS

The invention may best be understood by referring to the following description and accompanying drawings that are used to illustrate embodiments of the invention. In the drawings.

DETAILED DESCRIPTION

In an embodiment, a server computer manages interaction limits between user devices in a messaging system. The server computer receives configuration data from a first user of a first user device and establishes an interaction limit for the first user based on the configuration data. The interaction limit establishes a limit on a number of chargeable communications between the first user and a plurality of users that can be sent for the first user over a period of time. The server computer subsequently receives a request message from a second user device of a second user. The request message can include parameters, including a request for services. Using the parameters in the request message and the configuration data from the first user, the server computer selects the first user from a plurality of users. In one embodiment, the server computer monitors and evaluates the interaction limit for the first user prior to selecting the first user from the plurality of users. When the first user has not exceeded their interaction limit, the server computer transmits a quote message to the second user device indicating the selection of the first user and including a quote in response to the request for services in the request message. When the server computer receives an indication of a response message from the second user device for transmission to the first user device, the server computer processes the response message to determine if the response message is indicative of an interaction type that requires modifying a first user account associated with the first user of the first user device.

Embodiments of the invention provide many technical advantages. For example, managing interaction limits on messages or communications between users of a messaging system can result in efficient utilization of bandwidth and other computing resources throughout the messaging system, and communications networks used by the messaging system, by selecting appropriate recipients for messages and determining appropriate content for messages. For example, in a messaging system where communications are sent between users requesting services and service providers, interaction limits can be used to prevent the transmission of request messages to service providers who are unlikely to be able to perform the requested service (e.g., due to lack of time or resources by the service provider) and/or select a subset of service providers who have a higher probability of being able to perform the requested service.

Further, in some embodiments, the message verification process improves the user experience. For example, by directing request messages to service providers who have a high probability of performing the requested service (e.g., because the service providers selected have available budget) can improve the matching requesters and service providers, thereby improving the efficiency of the system from both the system and the user perspective.

Figure 1:
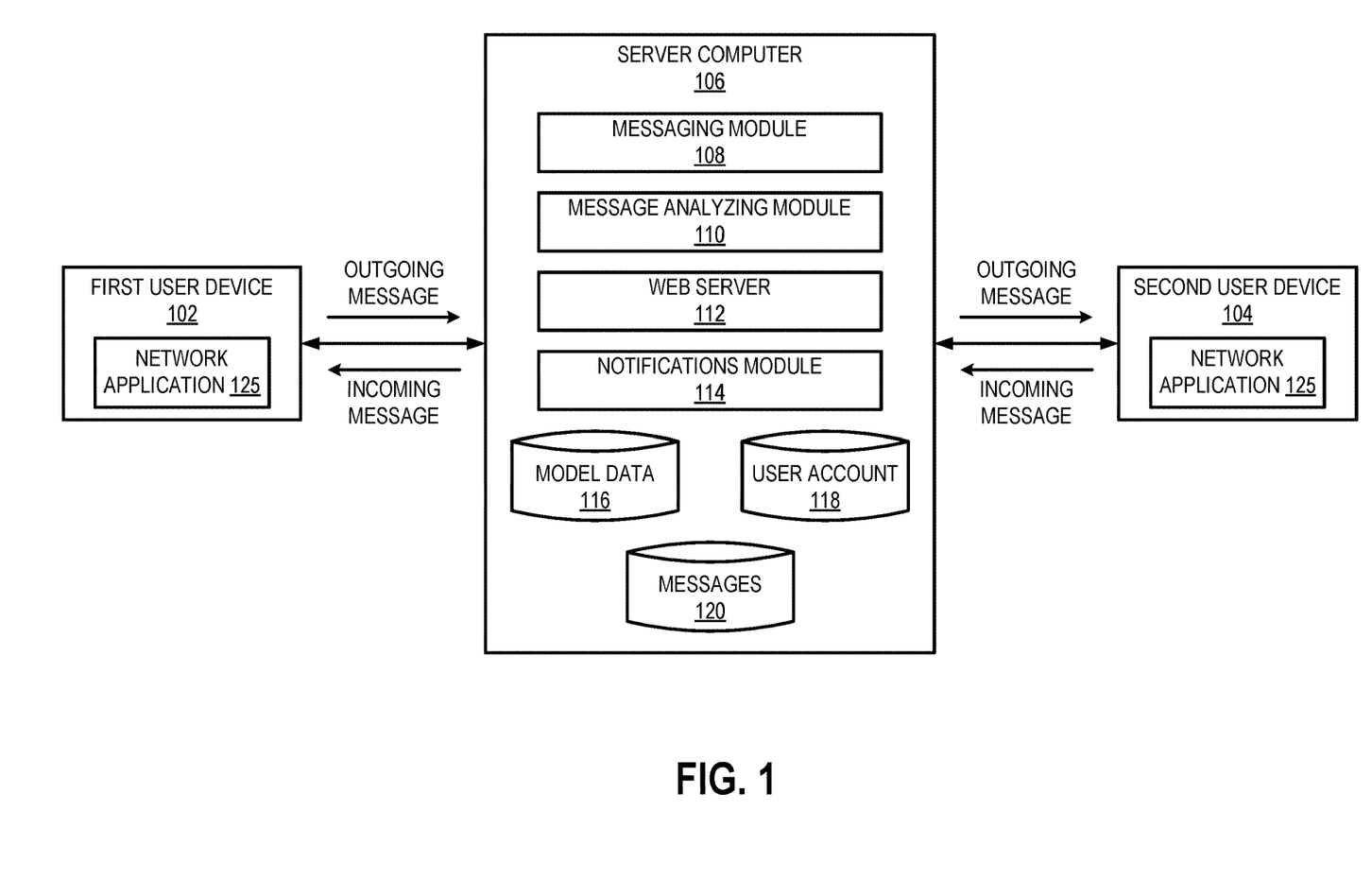
FIG. 1 illustrates an exemplary system according to some embodiments described herein.

FIG. 1 illustrates an exemplary network architecture that uses embodiments described herein. The system illustrated in FIG. 1 includes first user device 102, second user device 104, and server computer 106. In one embodiment, server computer 106 is situated between user devices 102 and 104 and is configured to communicate with user devices 102 and 104, as well as facilitate communications between user devices 102 and 104. Exemplary user devices 102 and 104 include conventional computer systems, such as a desktop computer or laptop computer, or may include devices having computer functionalities such as Personal Digital Assistants (PDA), tablet computers, cellular or mobile telephones, smartphones, wearable devices, or other electronic devices programmed to implement one or more embodiments set forth herein.

In one embodiment, user devices 102 and 104 are configured to interact with server computer 106 and can be computing devices capable of receiving user input as well as transmitting and/or receiving data via a network or a collection of networks, such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. The network may be wired, wireless, or a combination of both. In one embodiment, the network uses standard communications technologies and/or protocols.

In FIG. 1, server computer 106 includes messaging module 108, message analyzing module 110, web server 112, and notifications module 114. This embodiment also includes model data database 116, user account database 118, and messages database 120. Other embodiments of server computer 106 may include fewer or additional modules and databases than those depicted in FIG. 1.

Messaging module 108 is configured to receive or detect interactions (e.g., messages) sent by and/or between user devices 102 and 104. In some embodiments, messaging module 108 receives voice-based messages and/or text-based messages from user devices 102 and 104. For example, messages can be in the form of email messages, text messages, voice messages, etc. In some embodiments, messaging module 108 intercepts messages sent between user devices 102 and 104. In other embodiments, messaging module 108 receives messages sent through server computer 106.

Message analyzing module 110 is configured to perform an analysis of messages received by messaging module 108 from one of user devices 102 and 104 for sending to the other of user device 102 and 104. In some embodiments, message analyzing module 110 performs the analysis on a message prior to transmitting the message to the destination. In other embodiments, message analyzing module 110 performs the analysis on a message after, or in parallel, to transmitting the message to the destination. In some embodiments, message analyzing module 110 performs one or more binary checks on the message. In some embodiments, message analyzing module 110 analyzes the message, identifies keywords within the message, applies the identified keywords to a predictive model, and generates a likelihood value representing a probability of the message being indicative of a chargeable event.

In one embodiment, when server computer 106 sends quotes to other users (e.g., the user associated with first user device 102) on behalf of the user associated with second user device 104, message analyzing module 112 evaluates messages received in response. In some embodiments, message analyzing module 110 determines whether the message in response to the quote is indicative of a chargeable event (e.g., a message likely to lead to further interactions between a first user and a second user) or a non-chargeable event (e.g., a message that is spam or not likely to lead to further interactions between a first user and a second user). In one embodiment, a chargeable event is indicated by key words or phrases indicating a likely intent to hire the user associated with first user device 102 to perform services requested by the user associated with second user device 104. In some embodiments, message analyzing module 110 flags messages with the appropriate designation indicating the result of the analysis, and then can be processed by the messaging module 108 based on the flag. In some embodiments, messages that are marked as chargeable events can proceed normally to the intended destination of the message and server computer 106 modifies an account associated with a user. In some embodiments, message that are marked as being non-chargeable events can be prevented from being transmitted to the intended destination and server computer 106 does not modify an account associated with a user.

In one embodiment, each of user devices 102 and 104 executes network application 125 that is capable of transmitting and/or receiving network traffic. In one embodiment, network application 125 is a web browser or other application that can access network resources (e.g., web pages, images, word processing documents, PDF files, movie files, music files, or other computer files) hosted by web server 112. Web server 112 links the server computer 106 to one or more user devices 102 and 104 (e.g., via a network) by accepting requests (e.g., messages) from user devices 102 and 104 and/or transmitting web pages or other web-related content to user devices 102 and 104, such as image files, audio files, video files, Java applets, Flash, XML, JavaScript, Cascading Style Sheets (CSS), etc. In one embodiment, web server 112 displays an interface, e.g., a graphical user interface (GUI), to accept configuration data (e.g., user-defined interaction limits). In some embodiments, web server 112 utilizes a set of one or more network interfaces to send and receive messages across a network.

In some embodiments, web server 112 utilizes messaging module 108 to send and/or receive interactions (e.g., messages) to or between user devices 102 and 104. In some embodiments, messaging module 108 is operative to send and/or receive instant messages, queued messages (e.g., email), text and SMS (Short Message Service) messages, voice messages, or utilize any other suitable messaging technique.

Notifications module 114 is configured to generate notification messages. In one embodiment, notification module 114 generates notification messages indicating the result of the analysis performed by the message analyzing module 110. The notification messages can be generated for internal use by the message analyzing module 110, or can be sent to the intended destination (e.g., the second user device 104). For example, the notification message can be sent to inform the second user associated with the second user device 104 that the server computer 106 handled a message that was determined to be a chargeable event. The notification message can also inform the second user associated with the second user device 104 that modifications were made to a user account associated with the second user, e.g., a number of remaining interactions is reduced.

In one embodiment, notifications module 114 generates notification messages indicating that a number of interactions between a first user and a plurality of second users has reached a user-defined, or server-defined, interaction limit for a period. For example, a user establishes a maximum limit of ten interactions in a week. When the user has interacted with ten other users within a week, notifications module 114 generates a notification message indicating that the limit has been reached. In one embodiment, notifications module 114 generates the notification message when the user has interacted with close to ten other users. In one embodiment, the notification message can include an option allowing the user to increase their limit.

Model data database 116 stores data used by a predictive model. Model data database 116 uses the predictive model to determine whether messages received by server computer 106 are chargeable or non-chargeable events. In some embodiments, model data database 116 stores a list of blacklisted phrases or keywords. For example, blacklisted phrases or keywords can indicate that the message includes one or more of a payment scam, profanity, soliciting sex, have low intent to hire, is in a non-supported language, is looking for free services, and/or is sent by a minor, among other things. The blacklisted phrases or keywords can be pre-established within the system or can be learned by the system based on a history of previous messages analyzed.

User account database 118 stores account data for users of the system. In some embodiments, the account data includes user information, include contact information, payment information (e.g., payment account information), professional services requested, professional services offered, and previous bids provided by users. In one embodiment, user account database stores user-defined configuration data, including user-defined interaction limits, in a user profile. In some embodiments, user account database 118 tracks the number of interactions associated with a user in relation to a user-defined interaction limit. In some embodiments, user account database 118 stores a server-defined interaction limit, which can be generated based on the user-defined interaction limit.

Messages database 120 stores a history of previous messages sent through server computer 106. In one embodiment, the history of previous messages includes an indication of whether the messages were indicative of a chargeable event. In some embodiments, message analyzing module 110 uses the history of previous messages in messages database 120 with data stored in model data database 116 to refine the predictive model used to determine whether a message is likely to lead to a chargeable event. For example, particular words or phrases can be identified within messages that are indicative of being more likely to indicate a chargeable event or a non-chargeable event.

In one embodiment, server computer 106 implements interaction limits for communications between user devices (e.g., first user device 102 and second user device 104). In one embodiment, the communications can be in the form of email messages, text messages, voice calls, voice messages, etc. A typical interaction is initiated when server computer 106 receives a request message from a second user (e.g., the second user associated with second user device 104) where the request message includes one or more parameters, including a request for services. The interaction continues when server computer 106 sends a quote message to second user device 104 from or on behalf of the first user (e.g., the first user associated with first user device 102), a service provider who can perform the requested service. If server computer 106 receives a response message from second user device 104, responsive to the quote message, server computer 106 analyzes the response message to determine whether the interaction is a chargeable event (e.g., the response message has indicators indicating that the interactions between the first user and the second user will lead to the second user hiring the service provider to perform the requested service).

Interactions limits can be user-defined or server-defined. In one embodiment, a user-defined interaction limit defines how many chargeable interactions a service provider desires within a defined period of time, or an amount of money that the service provider has budgeted for spending within the defined period of time. For example, assuming the service provider provide configuration data establishing $100/week as their budget, and server computer 106 establishes that each chargeable event costs $10, the interaction limit is ten. In addition, server computer 106 can indicate an approximate number of quote messages the service provider can send based on the user-defined interaction limits.

In one embodiment, server computer 106 utilizes the user-defined interaction limit to calculate a server-defined interaction limit. The server-defined interaction limit can indicate an estimated number of quote messages that can be sent or an estimated number of hires.

In embodiments where server computer 106 utilizes the user-defined interaction limit to calculate an estimated number of quote messages that can be sent for the first user over a period of time, server computer 106 uses a predictive model to calculate a predicted number of quote messages based on the probability of an occurrence of a chargeable event/communication, the amount for each chargeable event/communication, and the user-defined interaction limit. For example, the user-defined interaction limit is a monetary amount establishing a user budget.

In embodiments where server computer 106 utilizes the user-defined interaction limit to calculate an estimated number of hires the first user could receive over a period of time, Server computer 106 calculates a predicted number of hires based on the probability of an occurrence of a chargeable event/communication, the amount for each chargeable event/communication, the probability of a chargeable event/communication resulting in the first user being hired, and the user-defined interaction limit.

In some embodiments, server computer 106 establishes varying rates for an interaction. In some embodiments, server computer 106 determines the amount to charge for a chargeable event after receiving a response message from second user device 104 in response to a quote message. In some embodiments, the rate varies based on the type of contact, the content or parameters of the request message, and a quick reply type of the response message. The content or parameters of the request message can include a type of service, or category of service, being requested, where different services or different categories of services are assigned different default quote amounts. Examples of quick reply types include: (1) "Sounds good! What's next?"; (2) "I'd love to chat. When can I call you?"; (3) "What's your next availability?"; (4) "What's the process for working together?"; (5) "Do you have any references?"; (6) "No thank you"; and (7) "Thanks, but I'm going a different route." In one embodiment, server computer 106 treats interactions with replies similar to examples 1-5 as chargeable events and interactions with replies similar to examples 6-7 as non-chargeable events. In embodiments where the amount charged for a chargeable event varies, server computer 106 provides an estimated server-defined interaction limit, and the estimated server-defined interaction limit can change after actual chargeable events occur and the available, or remaining, user budget is reduced by the rates of the actual chargeable events.

In one embodiment, when the number of chargeable events for the service provider reaches the interaction limit (e.g., ten in the above example) or is within a defined range of the interaction limit, server computer 106 can block any new interactions between the service provider and additional users. For example, server computer 106 can block the service provider from sending quotes until the service provider increases their budget or a new period begins with a fresh budget. In one embodiment, server computer 106 notifies the service provider that their interaction limit (e.g., either the user-defined or server-defined interaction limit) has been reached and allows the service provider to modify their configuration data, e.g., to increase their user-defined interaction limit.

Figure 2:
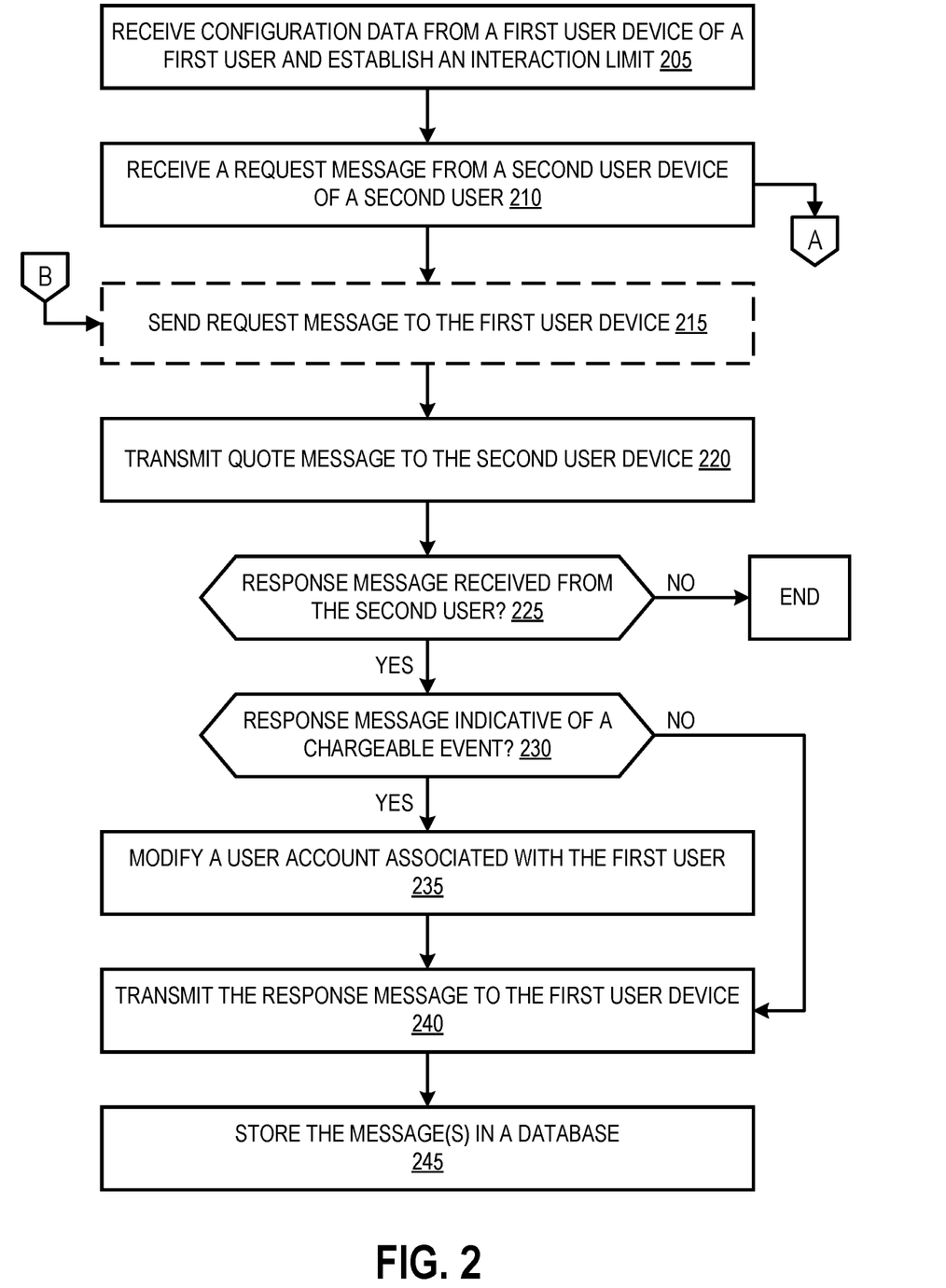
FIG. 2 is a flow diagram that illustrates exemplary operations for managing a messaging system according to an embodiment.

FIG. 2 is a flow diagram that illustrates exemplary operations for managing a messaging system according to an embodiment. The operations of FIG. 2 will be described with reference to the exemplary embodiment of FIG. 1. However, it should be understood that the operations of FIG. 2 can be performed by embodiments of the invention other than those discussed with reference to FIG. 1, and the embodiments discussed with reference to FIG. 1 can perform operations different than those discussed with reference to FIG. 2. In the embodiments described below with respect to FIGS. 2 and 3, the first user of first user device 102 is a service provider, and the second user of second user device 104 is a requesting user. In other embodiments, the first user and second user can be one or both of a service provider and requesting user.

At operation 205, server computer 106 receives configuration data from a first user device (e.g., first user device 102) of a first user. In one embodiment, the configuration data includes services provided by the first user, contact information for the first user, and user-defined interaction limits. In one embodiment, web server 112 generates a GUI requesting the first user associated with first user device 102 provide configuration data. In some embodiments, the GUI is accessible using network application 125 operating on first user device 102. Server computer 106 can store the configuration data in a user profile. In one embodiment, server computer 106 can establish a server-defined interaction limit for the user based on the user-defined interaction limits. In one embodiment, the GUI indicates an estimated number of interactions and/or an estimated number of interactions leading to projects (e.g., hires) based on the user-defined interaction limits.

Figure 4:
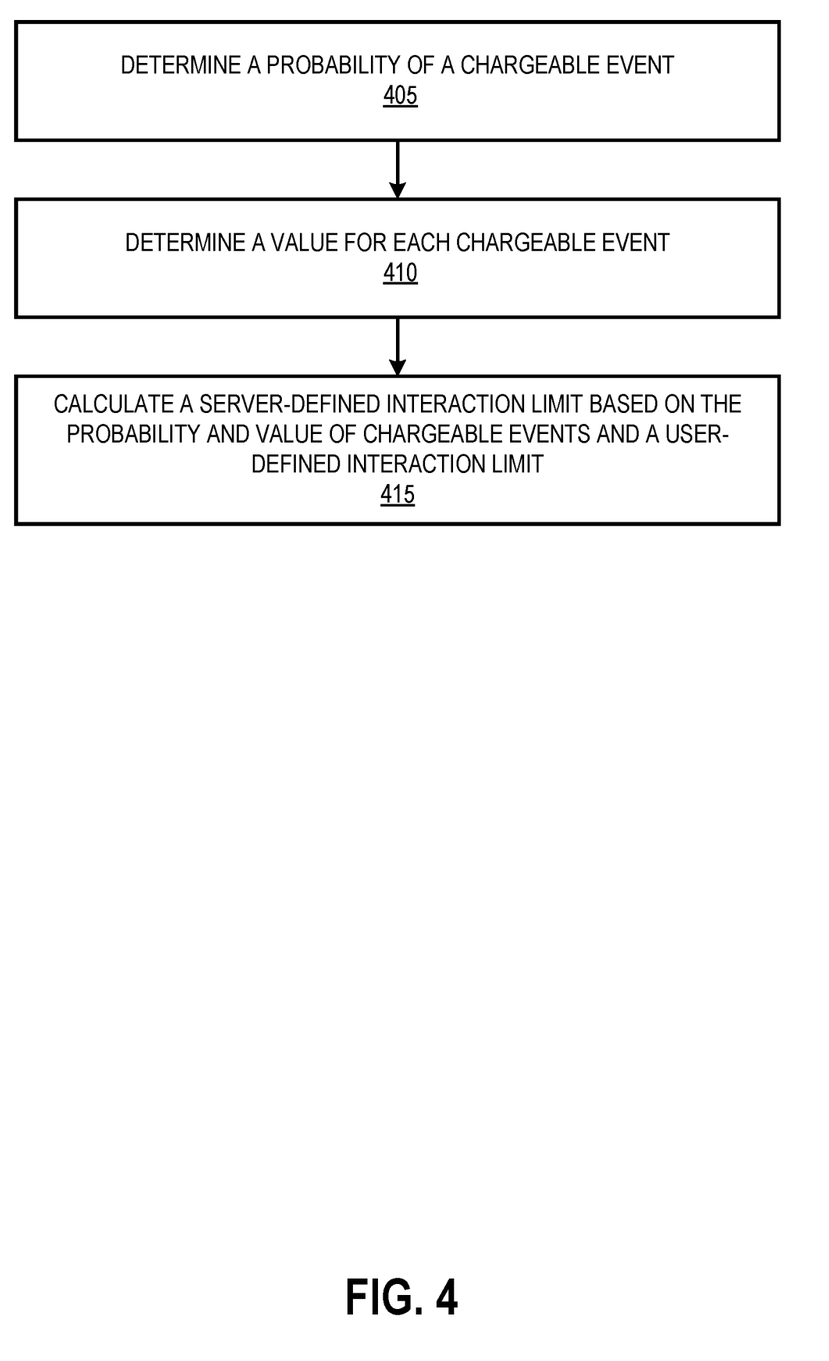
FIGS. 4-5 are flow diagrams that illustrate exemplary operations for calculating a server-defined interaction limit according to embodiments.
Figure 5:
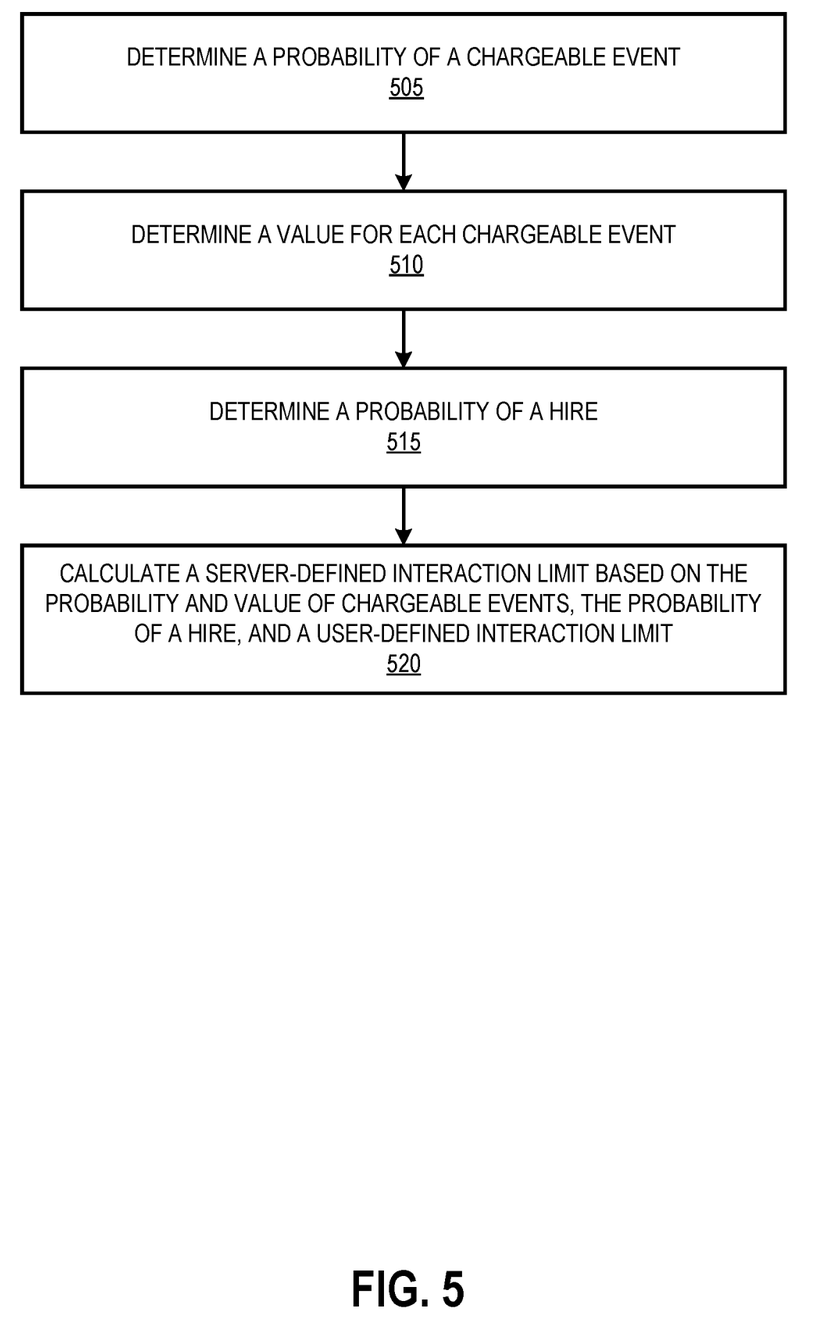

Additional details on how server computer 106 determines the server-defined interaction limit are described in FIGS. 4 and 5.

FIG. 4 is a flow diagram that illustrates exemplary operations for calculating a server-defined interaction limit according to an embodiment. In FIG. 4, the server-defined interaction limit is an estimate of the number of quote messages that can be sent over a period of time.

At operation 405, server computer 106 determines a probability of a chargeable event, such as a communication in response to a quote message. In one embodiment, the probability of a chargeable event can be based on two factors: the category of a requested service and an amount of time from when a quote message was sent. In one embodiment, server computer 106 determines a single probability across all categories (e.g., categories of requested services). In other embodiments, server computer 106 determines separate probabilities for each category. In some embodiments, server computer 106 applies a decay factor such that the probability of a chargeable event decreases over time until a quote in a quote message expires (e.g., after 30 days).

In other embodiments, server computer 106 determines the probability of a chargeable event using a predictive model. The predictive model can be a heuristic model that uses historical distribution data to make a prediction. In another embodiment, server computer 106 uses a machine learning model that makes a prediction based on information of the user requesting services, information of service providers, the requested service, and/or the category of the requested service. In one embodiment, server computer 106 applies various factors to a predictive model, including a number of quotes sent in response to the request, whether previous quotes within a range of the quote resulted in a chargeable event (e.g., a response message), etc.

At operation 410, server computer 106 determines a value for each chargeable event. Server computer 106 determines the value of a chargeable event based on a requested service or requested category of service. For example, server computer 106 determines the value of the requested service based on job values of the same service or similar services and/or quote histories of the same or similar services, including quotes processed through server computer 106, in addition to market research or third-party data. In one embodiment, server computer 106 averages previously quoted prices for the same service or similar service to determine the value for a chargeable event.

At operation 415, server computer 106 calculates the server-defined interaction limit (e.g., the predicted number of quote messages) based on the probability of the occurrence of a chargeable event, the value for each chargeable event, and the user-defined interaction limit. In one embodiment, the server-defined interaction limit is reached when the sum of the probability of the occurrence of a chargeable event multiplied by the value for each chargeable event is greater than or equal to the user-defined interaction limit.

FIG. 5 is a flow diagram that illustrates exemplary operations for calculating a server-defined interaction limit according to an embodiment. In FIG. 5, the server-defined interaction limit is an estimated number of hires.

At operation 505, server computer 106 determines a probability of a chargeable event, such as a communication in response to a quote message. In one embodiment, the probability of a chargeable event can be based on two factors: the category of a requested service and an amount of time from when a quote message was sent. In one embodiment, server computer 106 determines a single probability across all categories (e.g., categories of requested services). In other embodiments, server computer 106 determines separate probabilities for each category. In some embodiments, server computer 106 applies a decay factor such that the probability of a chargeable event decreases over time until a quote in a quote message expires (e.g., after 30 days).

In other embodiments, server computer 106 determines the probability of a chargeable event using a predictive model. In one embodiment, server computer 106 applies various factors to a predictive model, including a number of quotes sent in response to the request, whether previous quotes within a range of the quote resulted in a chargeable event (e.g., a response message), etc.

At operation 510, server computer 106 determines a value for each chargeable event. Server computer 106 determines the value of a chargeable event based on a requested service or requested category of service. For example, server computer 106 determines the value of the requested service based on job values of the same service or similar services and/or quote histories of the same or similar services, including quotes processed through server computer 106, in addition to market research or third-party data. In one embodiment, server computer 106 averages previously quoted prices for the same service or similar service to determine the value for a chargeable event.

At operation 515, server computer 106 determines the probability that a quote message will lead to a hire. In one embodiment, server computer 106 determines the probability of a quote converting to a hire using probabilities associated with each category of contact type (e.g., phone call, email message, quick reply message, etc.), the length of the response message responding to a quote message, and the content of the response message (e.g., asks for additional details, discusses scheduling, indicates they are not interested, etc.). In some embodiments, server computer 106 uses additional factors in determining the probability of a quote converting to a hire including: supply and demand, value of services requested, second user information (e.g., accessed server computer 106 using a search engine or social media advertisement/post, second user is a returning user, amount previously spent by second user on similar or other requested services, number of response messages sent by the second user with respect to a single request), quote engagement (e.g., number of quotes received and viewed, amount of time spent viewing quotes, etc.), details of the request (e.g., requested completion time, images uploaded, customer information disclosed, amount of information provided regarding requested service, etc.).

At operation 520, server computer 106 calculates the server-defined interaction limit (e.g., the predicted number of hires) based on the probability of the occurrence of a chargeable event, the value for each chargeable event, the probability of a quote converting to a hire, and the user-defined interaction limit.

The user can define the user-defined interaction limits for a predefined time period (e.g., week, month, quarter, etc.). In another example, the user can provide a specific number of interactions and server computer 106 can determine the appropriate server-defined interaction limit applicable to the number of interactions desired. For example, server computer 106 can define the server-defined interaction limit to be a number of interactions based on the user-defined interaction limit being a monetary amount, or server computer 106 can define the server-defined interaction limit to be a monetary amount based on the user-defined interaction limit being a number of desired interactions. Server computer 106 modifies a user account associated with the first user stored in user account database 118 based on the user-defined or server-defined interaction limits.

Figure 3:
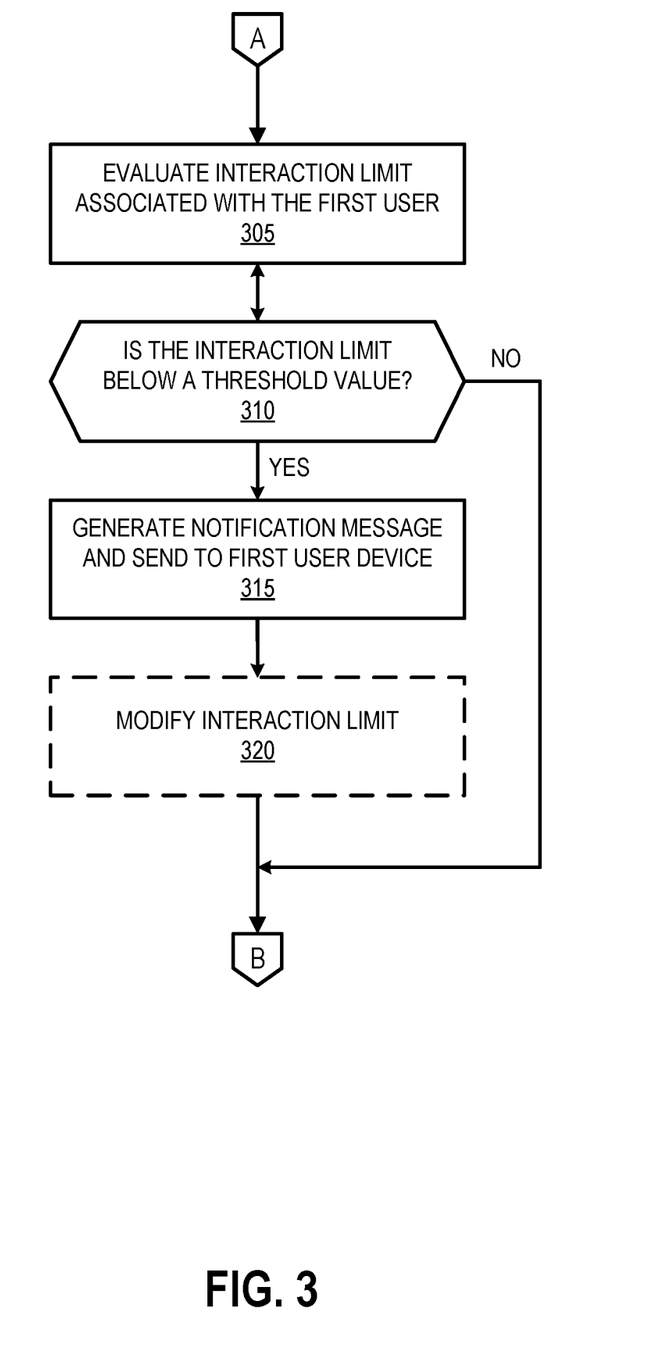
FIG. 3 is a flow diagram that illustrates exemplary operations for managing interaction limits in a messaging system according to an embodiment.

Returning to FIG. 2, at operation 210, server computer 106 receives a request message from a second user device (e.g., second user device 104) of a second user. For example, the request message may be a request received from the second user device 104 requesting a service to be performed. In some embodiments, server computer 106 receives the request message over a network from the second user device 104. In some embodiments, web server 112 facilitates the reception of the request message by generating a GUI, or other similar interface, accessible by second user device 104. In some embodiments, server computer 106 stores the received request message in messages database 120. In one embodiment, server computer 106 determines if a quote message can be sent by or on behalf of the first user based on the server-defined interaction limit (e.g., by proceeding with block 305 via off-page connector A).

At operation 215, server computer 106 optionally sends the request message to first user device 102. In one embodiment, message analyzing module 110 analyzes the request message to determine the appropriate user(s) to handle the request in the request message. For example, message analyzing module 110 determines the type of request (e.g., the service requested) in the request message, and matches the type of request to the appropriate user. In one embodiment, the first user associated with the first user device 102 generates and transmits a quote to server computer 106 in response to the received request message.

In some embodiments, server computer 106 does not send the request message to first user device 102 and proceeds to operation 220.

At operation 220, server computer 106 transmits a quote message to second user device 104. In some embodiments, server computer 106 receives a quote for the quote message from first user device 102. In other embodiments, server computer 106 automatically generates a quote and transmits a quote message to second user device 104. In such embodiments, server computer 106 generates a response (e.g., a quote) on behalf of the first user of first user device 102. Server computer 106 can generate the quote based on the request, user-provided criteria, and a history of previous quotes by the first user. For example, message analyzing module 110 can analyze the request in the request message, determine user(s) that can satisfy the request, and generate a response to the request message automatically on behalf of the determined user(s). In some embodiments where server computer 106 generates the quote on behalf of the first user, server computer 106 first selects the first user from a plurality of users (e.g., service providers) based on the probability of the first user accepting and completing the service requested being above a threshold value.

At operation 225, server computer 106 determines whether a response is received from second user device 106. In one embodiment, server computer 106 receives the response message when the interaction is performed using a communication means linked to server computer 106. For example, server computer 106 may provide a unique contact method (e.g., phone number, email address, meeting scheduling software), where the unique contact method can be tracked by server computer 106 to identify when an interaction has occurred. When server computer 106 receives a response from second user device 106, the method proceeds to operation 230. When server computer 106 does not receive a response from second user device 106, the process ends.

At operation 230, server computer 106 determines whether the received response from second user device 104 is indicative of a chargeable event (e.g., an event that requires modifying the user account of the first user to account against the interaction limit). In one embodiment, message analyzing module 110 performs the analysis of the received response. In some embodiments, as part of the analysis, the message analyzing module 110 accesses model data database 116 to utilize a predictive model. In one embodiments, the predictive model is based on analyses of previous communications sent via server computer 106. In some embodiments, model data database 116 includes blacklisted keywords and/or phrases and the type of non-chargeable and/or non-legitimate messages the blacklisted keywords and/or phrases correspond to. In some embodiments, model data database 116 includes user-inputted or machine-learned rules or content that are indicative of fraud, as well as rules or content that are indicators that the user account of the first user should be modified. For example, message analyzing module 110 determines whether the response received from second user device 104 includes words or phrases that indicate low intent to hire (e.g., "not interested", "no, thank you"), includes inappropriate language (e.g., profanity, threats, demanding free work or illegal activity, payment scams, etc.). When message analyzing module 110 determines that the response is indicative of a chargeable event, the method proceeds to operation 235. When message analyzing module 110 determines that the response is not indicative of a chargeable event, the method proceeds to operation 240, where the message is transmitted to first user device 102.

In one embodiment, server computer 106 determines that a chargeable event has occurred between the first user and second user based on user-provided data (e.g., phone or SMS surveys, user reviews, a user selecting a "hire" button on a GUI, etc.) and subsequent contacts between first user device 102 and second user device 104 after the response message from second user device 104 to first user device 102.

At operation 235, the server computer 106 modifies a user account of the first user associated with first user device 102. In some embodiments, server computer 106 accesses user account database 118 to retrieve the user account data associated with the user account of the first user. For example, because the second user responded to the quote message sent by or on behalf of the first user and message analyzing module 110 determined the message was indicative of a chargeable event, server computer 106 may post a charge to the user account of the first user. As noted above, server computer 106 charges an amount to the user account based on a plurality of factors, including: the type of contact, the content or parameters of the request message, and a quick reply type of the response message.

In one embodiment, server computer 106 determines the amount to charge to the user account as follows:

Price of a Chargeable Contact = (Value of Requested Service) ×

(Probability of a Quote Converting to a Hire) × (Take Rate)

In one embodiment, server computer 106 determines the value of a requested service based on job values of the same or similar services (e.g., based on market research) and/or quote histories of the same or similar services, including quotes processed through server computer 106. In one embodiment, server computer 106 determines the probability of a quote converting to a hire using probabilities associated with each category of contact type (e.g., phone call, email message, quick reply message, etc.), the length of the response message, and the content of the response message (e.g., discusses scheduling). Server computer 106 can use additional factors in determining the probability of a quote converting to a hire including: supply and demand, value of services requested, second user information (e.g., accessed server computer 106 using a search engine or social media advertisement/post, second user is a returning user, amount previously spent by second user on similar or other requested services, number of response messages sent by the second user with respect to a single request), quote engagement (e.g., number of quotes received and viewed, amount of time spent viewing quotes, etc.), request information (e.g., completion time, images uploaded, customer information disclosed, amount of information provided regarding requested service, etc.).

In one embodiment, the take rate is a value indicating an amount collected by server computer 106 for each chargeable event/contact. In one embodiment, the take rate is expressed as a percentage value. The take rate can vary by user, type of requested service, etc.

In some embodiment, server computer 106 determines the price of the chargeable contact when analyzing the response message from the second user to the first user (e.g., the first contact). Server computer 106 can also determine the price of the chargeable contact subsequent to the first contact. For example, server computer 106 can analyze subsequent messages between the first user and second user.

In addition, server computer 106 can modify the user account of the first user to indicate that an interaction has occurred that counts against the first user's interaction limit. For example, server computer 106 can increment a counter representing the number of interactions that were chargeable events, or server computer 106 can decrement a counter representing the number of remaining interactions before the first user exceeds their interaction limit.

At operation 240, server computer 106 transmits the response message to first user device 102. In one embodiment, messaging module 108 transmits the response message to first user device 102 using an appropriate communication means, such as over a communications network. In some embodiments, server computer 106 transmits the response message to first user device 102 without any alteration to the message as initially sent by second user device 104. In other embodiments, server computer 106 transmits the response message to first user device 102 with an indication that the response message was analyzed by message analyzing module 110 prior to the response message being sent to first user device 102. In such embodiments, server computer 106 can also indicate whether the response message was indicative of a chargeable event and whether server computer 106 made any modifications to the user account of the first user.

In some embodiments, messaging module 108 transmits the message to first user device 102 by displaying the message on a user interface associated with server computer 106. For example, messaging module 108 transmits the message for display on a website or application (e.g., network application 125) associated with server computer 106. In other embodiments, messaging module 108 transmits the message for display within a messaging application (e.g., an email or text message application) stored on second user device 104.

At operation 245, server computer 106 stores the message in messages database 120. In some embodiments, messages stored in messages database 120 are used by the message analyzing module 110 to refine the predictive model used to determine whether subsequent messages received by the server computer 106 are indicative of chargeable events.

In the embodiment described with respect to FIG. 2, the message analysis process is applied to the response message prior to the message being sent to its destination (e.g., first user device 102). In an alternative embodiment, server computer 106 sends the response message to first user device 102 prior to, or concurrently with, the message analyzing module 110 performing the analysis of the response message. In such an embodiment, assuming the response message from second user device 104 to first user device 102 was determined to be indicative of a chargeable event, server computer 106 can modify the user account associated with the first user, as described with respect to operation 235 in FIG. 2, prior to determining whether the response message is indicative of a chargeable event. In such a situation, if message analyzing module 110 determines that the response message was a non-chargeable message, server computer 106 can perform corrective measures on the user account of the first user. For example, server computer 106 may modify the user account of the first user to credit back a charge that was applied to the user account of the first user. In one embodiment, notifications module 114 also generates a notification message for transmission to first user device 102 indicating that the response message was determined to be a non-chargeable message and a credit has been posted to the user account of the first user. The notification message can then be transmitted to the second user device 104 by messaging module 108. In one embodiment, if message analyzing module 110 determines that the message was a chargeable message, server computer 106 does not take additional action, as the user account of the first user has already been modified.

FIG. 3 is a flow diagram that illustrates exemplary operations for managing interaction limits in a messaging system according to an embodiment. The operations of FIG. 3 will be described with reference to the exemplary embodiment of FIG. 1. However, it should be understood that the operations of FIG. 3 can be performed by embodiments of the invention other than those discussed with reference to FIG. 1, and the embodiments discussed with reference to FIG. 1 can perform operations different than those discussed with reference to FIG. 3.

At operation 305, server computer 106 monitors the interaction limit associated with the first user. In one embodiment, server computer 106 monitors and evaluates the interaction limit prior to sending a quote message on behalf of the first user and/or after server computer 106 determines the occurrence of a chargeable event and modifies the user account of the first user. In other embodiments, server computer 106 monitors and evaluates the interaction limit prior to sending a request message from a second user to the first user.

At operation 310, server computer 106 determines if the interaction limit is below a threshold value. In one embodiment, server computer 106 determines that the interaction limit is below the threshold value when the remaining budget for the period (e.g., the user budget minus the amount charged to the user account of the first user for chargeable events) is below a required remaining budget (RRB) for the period. In one embodiment, server computer 106 calculates the RRB as follows:

$$RRB = (\text{Probability of a Chargeable Contact}) \times (\text{Total Price for All Open and Outstanding Quotes})$$

In one embodiment, server computer 106 calculates an average value of quotes across a plurality of categories of services. In other embodiments, server computer 106 calculates an average price of quotes specific to each category. For example, server computer 106 identifies the number of chargeable contacts within a category for a specific period of time, and divides that value by the total number of quote messages within the category for the same specific period of time. Similarly, server computer 106 calculates the probability of a chargeable contact as an average value across a plurality of categories of services, or on a per category basis. In some embodiments, server computer 106 compares an amount of a quote to previous quotes having similar prices to assist in determining the probability of the contact being chargeable. In one embodiment, a quote remains open for a predefined period (e.g., 30 days), and if server computer 106 does not receive a response message within the predefined period, server computer 106 cancels or terminates the quote.

In some scenarios, quotes can remain open for a period of time exceeding the time period for the interaction limit associated with the first user. For example, the time period for the interaction limit can be for a week, while a quote can remain open for 30 days. As the amount of the time from the sending of the quote increases, the likelihood of the quote resulting in a chargeable event/contact diminishes. A growing number of outstanding quotes can quickly increase the RRB, resulting in server computer 106 blocking request messages from being sent to the first user and/or blocking the sending of quote message for the first user In such embodiments, server computer 106 applies a decay factor to the probability of a contact being a chargeable contact, based on the amount of time since the quote message was sent. Thus, as the amount of time since an outstanding quote was sent increases, the decay factor applied to the probability of a chargeable contact results in a decreased value for the RRB. Utilizing a decay factor in this manner can increase the number of interactions for the first user (e.g., request messages sent to the first and/or quote message sent for the first user).

When the interaction limit is below the threshold value, the method proceeds to operation 315. When the interaction limit is not below the threshold value, server computer 106 continues to send quote message for or on behalf of the first user (e.g., by proceeding with block 215 via off-page connector B). In such embodiments, server computer 106 continues to monitor the interaction limit associated with the first user as new request messages are received.

At operation 315, server computer 106 generates a notification message and sends the notification message to first user device 102 in response to determining that the interaction limit is below the threshold value. In one embodiment, server computer 106 notifies the first user that their interaction limit has been reached and allows the first user to modify their configuration data, e.g., to increase their interaction limit.

At operation 320, server computer 106 optionally modifies the interaction limit. In response to the first user associated with the first user device 102 requesting an increase in their interaction limit (e.g., an increase in the budget or number of interactions), server computer 106 modifies the user account of the first user by increasing the budget or interaction limit. In one embodiment, server computer 106 establishes the increased budget or interaction limit for the current period and does not modify the default budget or interaction limit for subsequent periods, or establishes the increased budget or interaction limit as updated values for subsequent periods.

Figure 6:
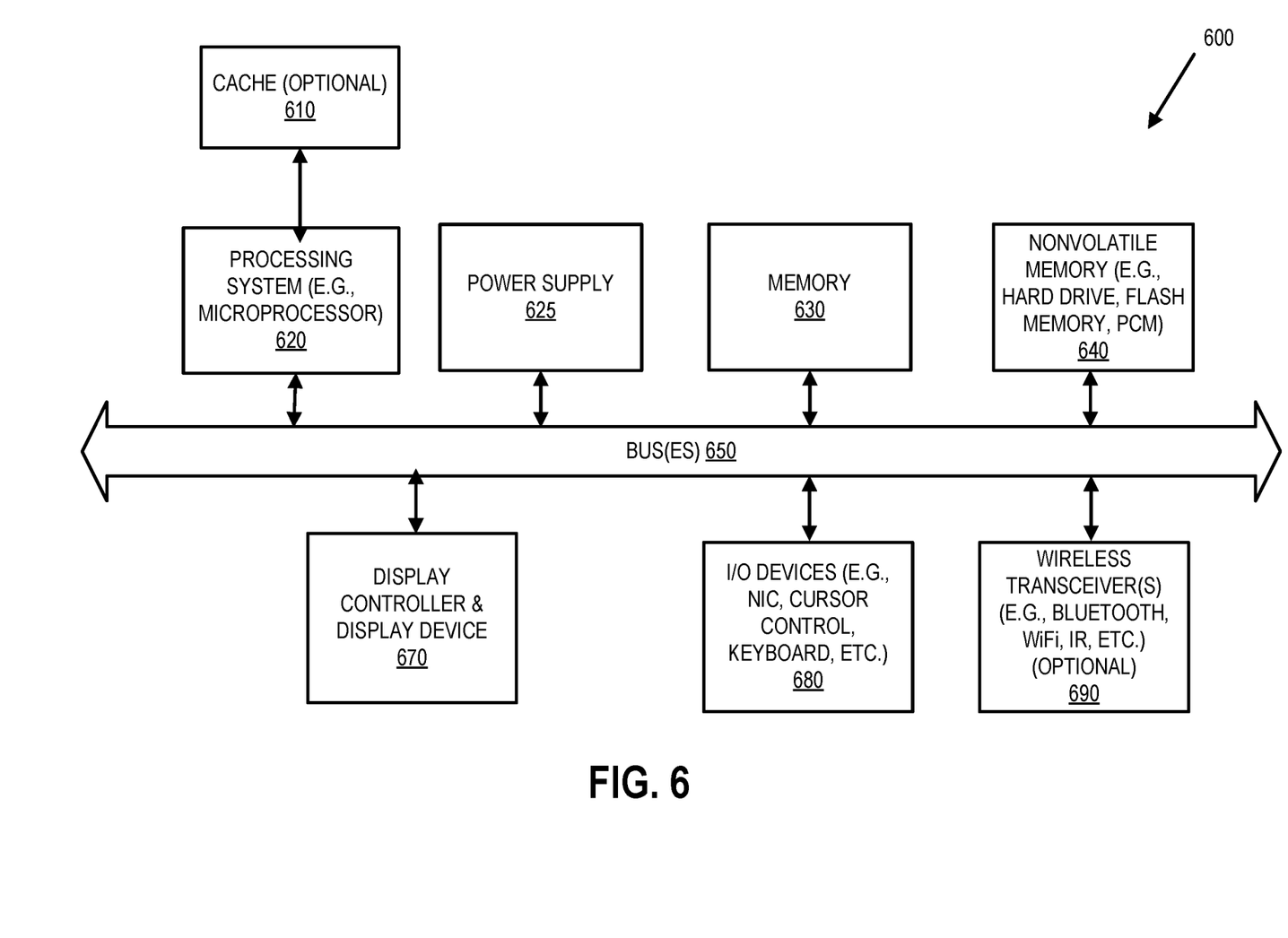
FIG. 6 is a block diagram illustrating a data processing system that can be used in an embodiment.

As illustrated in FIG. 6, the computer system 600, which is a form of a data processing system, includes the bus(es) 650 which is coupled with the processing system 620, power supply 625, memory 630, and the nonvolatile memory 640 (e.g., a hard drive, flash memory, Phase-Change Memory (PCM), etc.). The bus(es) 650 may be connected to each other through various bridges, controllers, and/or adapters as is well known in the art. The processing system 620 may retrieve instruction(s) from the memory 630 and/or the nonvolatile memory 640, and execute the instructions to perform operations described herein. The bus 650 interconnects the above components together and also interconnects those components to the display controller & display device 670, input/output devices 680 (e.g., NIC (Network Interface Card), a cursor control (e.g., mouse, touchscreen, touchpad, etc.), a keyboard, etc.), and the optional wireless transceiver(s) 690 (e.g., Bluetooth, Wi-Fi, Infrared, etc.). In one embodiment, the client device, caching system, and/or service device described herein may take the form of the computer system 600.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer-implemented method comprising:
    receiving configuration data from a first user of a first user device;
    establishing an interaction limit for the first user based on the configuration data;
    receiving a request message from a second user device of a second user, the request message including parameters, the parameters including a request for services;
    selecting the first user from a plurality of users to transmit a quote message on behalf of, the first user selected based on a probability of the first user accepting and completing the request being above a first threshold value, the probability calculated using the parameters in the request message from the second user and the configuration data from the first user, the configuration data from the first user including an amount the first user has budgeted for spending during a defined period of time;
    in response to selecting the first user from the plurality of users, automatically generating a quote on behalf of the first user;
    transmitting the quote message to the second user device indicating the selection of the first user and including the quote in response to the request message;
    receiving an indication of a response message from the second user device, the response message for transmission to the first user device; and
    processing the response message using a predictive model to determine if the response message requires modifying a first user account associated with the first user of the first user device.

2. The computer-implemented method of claim 1, wherein processing the response message using the predictive model to determine if the response message requires modifying the first user account associated with the first user of the first user device comprises:
    determining that the response message is indicative of an interaction type that requires modifying the first user account associated with the first user of the first user device; and
    modifying the first user account in response to determining that the response message is indicative of the interaction type that requires modifying the first user account.

3. The computer-implemented method of claim 2, wherein determining that the response message is indicative of the interaction type that requires modifying the first user account associated with the first user of the first user device comprises:
    analyzing the response message to identify one or more keywords; and
    generating a likelihood value representing a probability of the response message being indicative of the interaction type based on an application of the one or more keywords to a predictive model, wherein the response message is indicative of the interaction type that requires modifying the first user account when the likelihood value is above a second threshold value.

4. The computer-implemented method of claim 2, wherein modifying the first user account includes modifying the interaction limit, and wherein the method further comprises:
    evaluating the interaction limit associated with the first user account; and
    in response to determining that the interaction limit is below a third threshold value:
        generating a notification message, and
        sending the notification message to the first user device requesting an increase in the interaction limit.

5. The computer-implemented method of claim 1, wherein selecting the first user from the plurality of users based on the parameters in the request message and the configuration data from the first user further comprises:
    accessing the configuration data stored in a profile of the first user;
    determining that the configuration data satisfies the parameters in the request message;
    calculating the quote for inclusion in the quote message based on the parameters and the configuration data; and
    generating the quote message with the calculated quote.

6. The computer-implemented method of claim 1, wherein the interaction limit establishes a limit on a number of chargeable communications between the first user and the plurality of users that can be sent for the first user over a period of time.

7. The computer-implemented method of claim 1, wherein the interaction limit is a monetary value, and wherein the method further comprises:
    calculating an estimated number of quote messages that can be sent for the first user over a period of time based on a probability of an occurrence of a chargeable communication, an amount for each chargeable communication, and the interaction limit.

8. A non-transitory machine-readable storage medium that provides instructions that, when executed by a processor, cause said processor to perform operations comprising:
receiving configuration data from a first user of a first user device;
establishing an interaction limit for the first user based on the configuration data;
receiving a request message from a second user device of a second user, the request message including parameters, the parameters including a request for services;
selecting the first user from a plurality of users to transmit a quote message on behalf of, the first user selected based on a probability of the first user accepting and completing the request being above a first threshold value, the probability calculated using the parameters in the request message from the second user and the configuration data from the first user, the configuration data from the first user including an amount the first user has budgeted for spending during a defined period of time;
in response to selecting the first user from the plurality of users, automatically generating a quote on behalf of the first user;
transmitting the quote message to the second user device indicating the selection of the first user and including the quote in response to the request message;
receiving an indication of a response message from the second user device, the response message for transmission to the first user device; and
processing the response message using a predictive model to determine if the response message requires modifying a first user account associated with the first user of the first user device.

9. The non-transitory machine-readable storage medium of claim 8, wherein processing the response message using the predictive model to determine if the response message requires modifying the first user account associated with the first user of the first user device comprises:
determining that the response message is indicative of an interaction type that requires modifying the first user account associated with the first user of the first user device; and
modifying the first user account in response to determining that the response message is indicative of the interaction type that requires modifying the first user account.

10. The non-transitory machine-readable storage medium of claim 9, wherein determining that the response message is indicative of the interaction type that requires modifying the first user account associated with the first user of the first user device comprises:
analyzing the response message to identify one or more keywords; and
generating a likelihood value representing a probability of the response message being indicative of the interaction type based on an application of the one or more keywords to a predictive model, wherein the response message is indicative of the interaction type that requires modifying the first user account when the likelihood value is above a second threshold value.

11. The non-transitory machine-readable storage medium of claim 9, wherein modifying the first user account includes modifying the interaction limit, and wherein the instructions further cause said processor to perform operations comprising:
evaluating the interaction limit associated with the first user account; and
in response to determining that the interaction limit is below a third threshold value:
generating a notification message, and
sending the notification message to the first user device requesting an increase in the interaction limit.

12. The non-transitory machine-readable storage medium of claim 8, wherein selecting the first user from the plurality of users based on the parameters in the request message and the configuration data from the first user further comprises:
accessing the configuration data stored in a profile of the first user;
determining that the configuration data satisfies the parameters in the request message;
calculating the quote for inclusion in the quote message based on the parameters and the configuration data; and
generating the quote message with the calculated quote.

13. The non-transitory machine-readable storage medium of claim 8, wherein the interaction limit establishes a limit on a number of chargeable communications between the first user and the plurality of users that can be sent for the first user over a period of time.

14. The non-transitory machine-readable storage medium of claim 8, wherein the interaction limit is a monetary value, and wherein the instructions further cause said processor to perform operations comprising:
calculating an estimated number of quote messages that can be sent for the first user over a period of time based on a probability of an occurrence of a chargeable communication, an amount for each chargeable communication, and the interaction limit.

15. An apparatus, comprising:
a processor; and
a non-transitory machine-readable storage medium coupled with the processor that stores instructions that, when executed by the processor, cause said processor to perform the following:
receive configuration data from a first user of a first user device;
establish an interaction limit for the first user based on the configuration data;
receive a request message from a second user device of a second user, the request message including parameters, the parameters including a request for services;
select the first user from a plurality of users based on the parameters in the request message and the configuration data from the first user;
select the first user from a plurality of users to transmit a quote message on behalf of, the first user selected based on a probability of the first user accepting and completing the request being above a first threshold value, the probability calculated using the parameters in the request message from the second user and the configuration data from the first user, the configuration data from the first user including an amount the first user has budgeted for spending during a defined period of time;
in response to the selection of the first user from the plurality of users, automatically generate a quote on behalf of the first user;
transmit the quote message to the second user device indicating the selection of the first user and including the quote in response to the request message;
receive an indication of a response message from the second user device, the response message for transmission to the first user device; and process the response message using a predictive model to determine if the response message requires modifying a first user account associated with the first user of the first user device.

16. The apparatus of claim 15, wherein processing the response message using the predictive model to determine if the response message requires modifying the first user account associated with the first user of the first user device comprises:
   determining that the response message is indicative of an interaction type that requires modifying the first user account associated with the first user of the first user device; and
   modifying the first user account in response to determining that the response message is indicative of the interaction type that requires modifying the first user account.

17. The apparatus of claim 16, wherein determining that the response message is indicative of the interaction type that requires modifying the first user account associated with the first user of the first user device comprises:
   analyzing the response message to identify one or more keywords; and
   generating a likelihood value representing a probability of the response message being indicative of the interaction type based on an application of the one or more keywords to a predictive model, wherein the response message is indicative of the interaction type that requires modifying the first user account when the likelihood value is above a second threshold value.

18. The apparatus of claim 16, wherein modifying the first user account includes modifying the interaction limit, and wherein the instructions further cause said processor to:
   evaluate the interaction limit associated with the first user account; and
   in response to determining that the interaction limit is below a third threshold value:
      generate a notification message, and
      send the notification message to the first user device requesting an increase in the interaction limit.

19. The apparatus of claim 15, wherein selecting the first user from the plurality of users based on the parameters in the request message and the configuration data from the first user further comprises:
   accessing the configuration data stored in a profile of the first user;
   determining that the configuration data satisfies the parameters in the request message;
   calculating the quote for inclusion in the quote message based on the parameters and the configuration data; and
   generating the quote message with the calculated quote.

20. The apparatus of claim 15, wherein the interaction limit establishes a limit on a number of chargeable communications between the first user and the plurality of users that can be sent for the first user over a period of time.

21. The apparatus of claim 15, wherein the interaction limit is a monetary value, and wherein the instructions further cause said processor to:
   calculate an estimated number of quote messages that can be sent for the first user over a period of time based on a probability of an occurrence of a chargeable communication, an amount for each chargeable communication, and the interaction limit.

* * * * *